Feb. 13, 1968 H. S. YOURKE ET AL 3,369,075
TRANSMISSION SYSTEM FOR DIRECT CURRENT LEVEL BINARY DATA
Filed Nov. 13, 1964
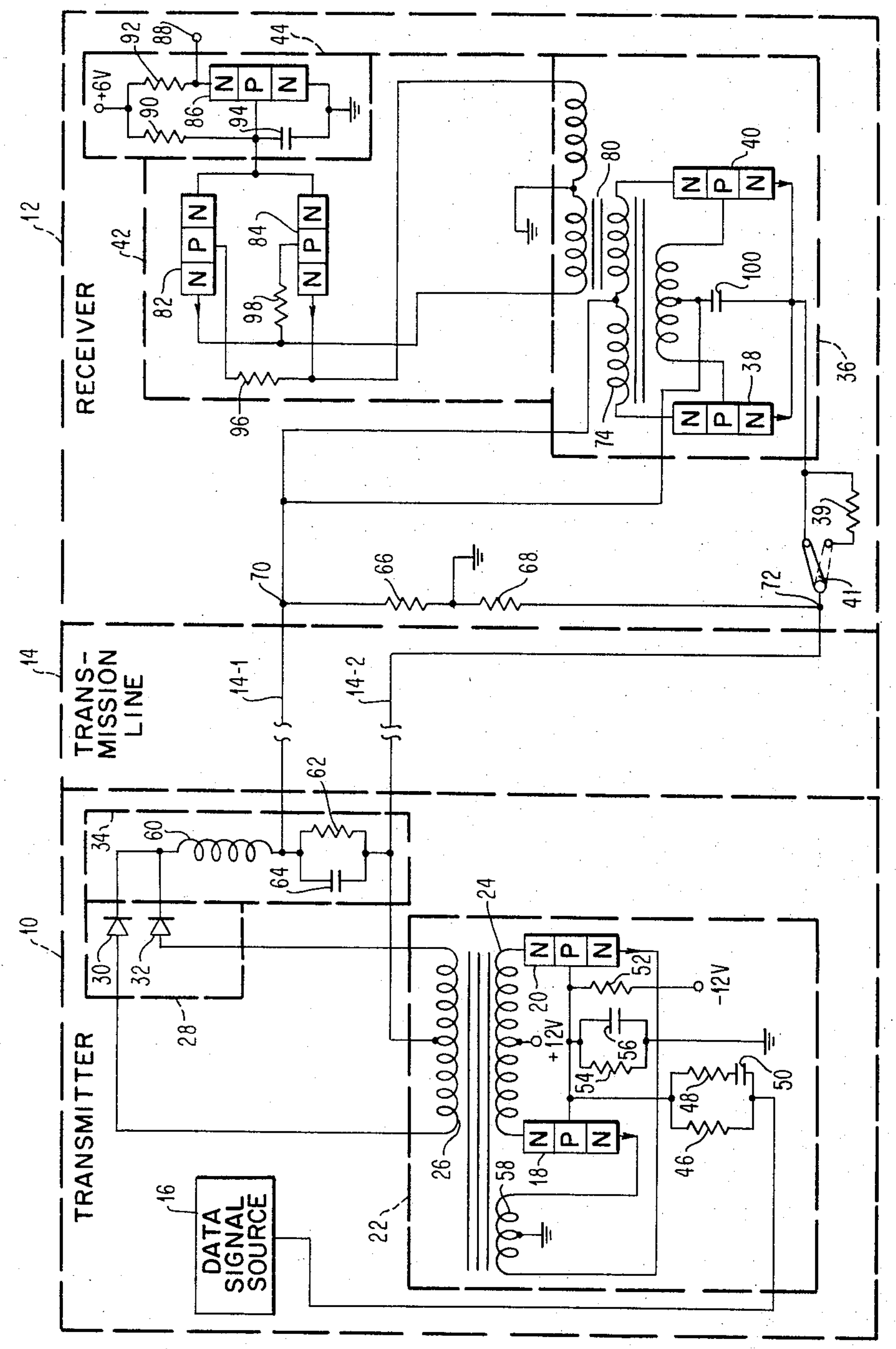
INVENTORS
HANNON S. YOURKE
EDWARD J. CALLAHAN
BY John J. Goodwin
ATTORNEY

3,369,075
TRANSMISSION SYSTEM FOR DIRECT CURRENT LEVEL BINARY DATA

Hannon S. Yourke, Peekskill, and Edward J. Callahan, Mahopac, N.Y., assignors to International Business Machines Corporation, New York, N.Y., a corporation of New York Filed Nov. 13, 1964, Ser. No. 410,857
5 Claims. (Cl. 178—68)

ABSTRACT OF THE DISCLOSURE

This disclosure is a direct current data transmission system for twisted pair type of transmission lines. Data is put on the line by an AC coupled rectifier system and is decoded from the line by use of blocked oscillator which is powered by the voltage difference across the pair of conductors of the line. An AC coupling from the blocked oscillator to a controlled output level setter completes the transmission without interference from common mode noise voltages on the line.

*Objects of the invention*

The present invention relates to the transmission of binary data and more particularly to a system for transmitting binary data having direct current levels over twisted pair transmission lines such as unloaded telephone lines. A common form of manifesting binary data is to vary a signal between two levels in accordance with the binary information. Such type signal inherently contains a direct current level. The transmission of binary data signals over long distances is usually carried out by twisted pair telephone type lines. One problem associated with the transmission of binary data containing a direct current level over such twisted pair telephone type lines is that a large difference in ground potential can exist between two spaced locations. Because of this problem it is a usual restriction that only one end of the transmission line may have a low resistance path to ground.

At the receiver end of a binary data transmission system as described, the binary data is generally recovered by detecting the difference signal across the twisted pair. A serious problem which is present in the detection of the difference signal is the presence of common mode noise. Common mode noise is frequently encountered in twisted pair cable transmission systems and the level of such common mode noise may greatly exceed the amplitude of the data signal itself.

An object of the present invention is to provide a system for the transmission of a direct current level binary data signal that does not require a ground return at both the transmitter and receiver ends.

Another object of the present invention is to provide a direct current level binary data transmission system employing twisted pair transmission lines wherein the common mode noise is rejected by the receiver.

The foregoing and other features and advantages of the invention will be apparent from the following more particular description of a preferred embodiment of the invention as illustrated in the accompanying drawing.

*Description of the drawing*

The accompanying drawing is a schematic showing of the preferred embodiment of the invention including a transmitter and a receiver.

A D.C. level binary data transmission system is shown basically including a transmitter 10 and a receiver 12 which are coupled via a twisted pair transmission line

14 including lines 14–1 and 14–2. Transmitter 10 includes a source of binary data signal 16 in the form of D.C. level signals such as the type wherein a signal level change occurs when the binary data changes from a "0" bit to a "1" bit or vice versa. The source of binary data signal 16 is coupled to the base connections of transistors 18 and 20 in symmetrical blocking oscillator 22. The symmetrical blocking oscillator 22 is gated either on or off depending on the signal level from source of binary data signal 16. When turned on, the symmetrical blocking oscillator 22 provides a 4 megacycle per second square wave which is coupled across from transformer primary 24 to transformer secondary 26. Thus, a high frequency alternating current signal having a square wave envelope representative of the binary data is produced at the transformer secondary 26. This signal is full wave rectified by rectifier stage 28 including diodes 30 and 32 and is smoothed by filter 34 and applied to the twisted pair transmission line 14 as a substantially direct current input signal. The twisted pair transmission line 14 terminates at receiver 12 which includes a difference chopper detector 36. The difference chopper detector 36 includes two NPN transistors 38 and 40 connected in a symmetrical blocking oscillator arrangement across the twisted pair transmission line 14 and oscillates in response to a data signal applied on the line pair 14. Pulse transformer windings interconnect both the collector electrodes and the base electrodes of the two transistors 38 and 40. An output signal from difference chopper detector 36 is provided across a third winding of the pulse transformer. The output of the difference chopper detector 36 is full wave rectified and amplified by circuit 42 and applied to a level setting circuit 44. The operation of the receiver 12 is such that any input current to the chopper detector 36 as a result of data signals on transmission line 14 produces a first given level output signal from circuit 44. In the absence of data signals the output from circuit 44 is at a second given level.

More particularly, source of binary data signal 16 is coupled via a resistor 46, which is in parallel with a resistor 48 and a capacitor 50, to the base of NPN transistor 18 and to the base of NPN transistor 20. A negative twelve volt potential source is applied through a voltage divider circuit consisting of resistor 52 and resistor 54 in parallel with capacitor 56 to the bases of transistors 18 and 20, thereby back biasing transistors 18 and 20 in the off state. When the data signal from source 16 goes from zero level to positive six volts the transistors 18 and 20 will be forward biased and conduct. Circuit 22 is thus a symmetrical blocking oscillator which will oscillate as long as the data signal level from source 16 is up. The frequency of oscillation is approximately 4.0 megacycles per second when circuit parameters having values to be later set forth are employed. Winding 58 serves as the collector to emitter connection for transistors 18 and 20, and resistor 46 serves to limit drive current from the data signal source 16.

Therefore, whenever the data signal from source 16 is at its up level, a 4.0 megacycle square wave signal is coupled from transformer primary 24 to transformer secondary 26 and then full wave rectified by rectifier 28 and smoothed by filter 34 which includes inductance 60, resistor 62 and capacitor 64. The rectified and filtered data signal is then applied across twisted pair transmission line 14 to receiver 12 and is manifested as a level change between lines 14–1 and 14–2. The polarity of the signal on line 14–1 is positive with respect to that of line 14–2 in order that the collectors of NPN transistors 38 and 40 be positive.

Difference chopper detector 36 is a low level, symmetrical blocking oscillator circuit requiring no source of energy other than the data signal itself. The quiescent operating voltage of transistors 38 and 40 is zero volts, that is, the collectors and bases of the two transistors are direct current shorted. The circuit will oscillate with input currents ranging from a fraction of a milliamp up to the maximum collector current ratings of the transistors. Transistors 38 and 40 must have low saturation resistance and good gain and frequency characteristics at the edge of saturation. The peak-to-peak collector to base voltage swing will be approximately twice the emitter to base drop of the transistors at the value of input current flowing.

Voltage drop across circuit 36 between the input nodes will be approximately the emitter to base voltage drop of the transistors as determined by the value of input current flowing. Thus, difference chopper detector 36 oscillates during the period when a data signal is being transmitted on transmission line 14.

The oscillating signal, which is in the form of a symmetrical and essentially square wave, is applied from pulse transformer winding 80 across full wave rectifier and amplifier stage 42 composed of cross coupled NPN transistors 82 and 84. The full wave rectified signal from rectifier stage 42 is then applied to a level setting circuit 44. The rectified signal from rectifier 42 is applied to the base of transistor 86 thereby turning it off and producing an output signal level on output terminal 88.

Circuit 36 will only respond to a difference signal between lines 14–1 and 14–2 and is therefore insensitive to common mode noise (equal potentials with respect to ground at points 70 and 72). The only practical limit on common mode potential is the insulation breakdown voltage of the pulse transformer windings. Precision resistors 66 and 68 are not essential to the operation of the transmission system. Indeed, no ground return is absolutely required at either end of the transmission system. Resistors 66 and 68 provide two desirable functions. They limit the development of a large static charge which could conceivably cause breakdown of the pulse transformer windings, and they minimize the effects of unsymmetrical capacitance to ground of lines 14–1 and 14–2, which could result in the generation of difference mode noise.

Since circuit 36 is a low impedance circuit, the input current for the circuit shown is determined largely by the direct current resistance of the transmission line. For distances on the order of one mile to one and one-half miles, no additional current limiting is necessary or desirable. A limiting resistor is necessary for shorter distances (less than one mile). Thus resistor 39 is provided between point 72 and the emitters of transistors 38 and 40. A switch 41 is provided so that resistors 39 may be included when required to limit input current to the transistors 38 and 40 and also to achieve maximum bandwidth capabilities.

From the aforesaid description it is seen that the primary transmission function is accomplished, that is, when the data signal level from source 16 in transmitter 10 changes level, a corresponding level change is produced at terminal 88 of receiver 12. The desired basic objects have also been realized, that is, only the receiver end of the system has a low resistance path to ground and common mode noise is rejected.

In the interests of providing a complete preferred embodiment, the following table sets forth the values of the parameters of the circuit in the drawing:

*Table I*

| | | |
|---|---|---|
| Resistors: | | |
| 46 | ohms | 3K |
| 48 | do | 560 |
| 52 | do | 10K |
| 54 | do | 100 |
| 62 | do | 33 |
| 66 | do | 150 |
| 68 | do | 150 |
| 90 | do | 8.1K |
| 92 | ohms | 810 |
| 96 | do | 100 |
| 98 | do | 100 |
| Capacitors: | | |
| 50 | μf | .03 |
| 56 | μf | .01 |
| 64 | μf | .015 |
| 94 | μf | .0015 |
| 100 | μf | .004 |
| Inductance coil 60 | μh | 47 |
| Transformer primary coil 24 | turns | 128 |
| Transformer secondary coil 26 | do | 32 |
| Transformer primary coil 74 | do | 70 |
| Transformer secondary coil | do | 30 |
| Transformer secondary coil 80 | do | 100 |

The frequency of oscillation of the detector 36 is approximately in the 10 megacycle per second range for small input currents at point 70 and will decrease with increasing input current. The oscillating signal across transformer winding 80 is a symmetrical and essentially square wave. The frequency components during the switching transients are high and virtually independent of the frequency of oscillation. These properties minimize problems associated with filtering of a full wave rectified signal. Further, there are no direct current components of flux in the transformer and, therefore, no problems associated with buildup of decay of a D.C. component. The output signal will attain full amplitude the instant the input current is applied and will go abruptly to zero when the input current is removed, regardless of the state of oscillation. The actual frequency of oscillation is relatively unimportant.

The system as shown in the drawing has been found to provide reliable transmission of direct current data at bit rates up to 160 kilobits per second over a twisted pair loop specially selected for high noise levels over a distance of one and one-half miles. Common mode noise potentials of the order of eighty volts peak to peak have been observed across the precision resistors 66 and 68 with no effect on the data reception. This, it can be said that in the system of the present invention the common potential of the twisted pair transmission line 14 is limited only by such factors as insulation breakdown and not by factors such as power supplies and transistor breakdown voltages and also allows for termination of the line in a very low impedance which is desirable for long lines.

It has been further found that the receiver 12 is capable of detecting data signals having currents ranging from 2.5 milliamps up to the maximum current ratings of the transistors.

While the invention has been particularly shown and described with reference to a preferred embodiment thereof, it will be understood by those skilled in the art that various changes in form and details may be made therein without departing from the spirit and scope of the invention.

What is claimed is:

1. A data transmission system for binary data signals comprising a transmitter, a receiver, and transmission means electrically connecting said transmitter and receiver;

said transmitter producing an output signal which alternates between a significant amplitude level and a zero amplitude in accordance with binary data;

said transmission means including first and second transmission wires forming a twisted pair transmission line for conducting said transmitter output signal;

said receiver including an oscillator means connected between said first transmission line and said second transmission line for providing an oscillating output signal in response to significant differences between the amplitudes of said first and second transmission lines;

said oscillator being non-responsive when said amplitude levels on said first and second transmission wires are equal.

2. A data transmission system according to claim 1 wherein said transmitter includes a source of data signal which varies between two direct current voltage levels in accordance with binary data;

an oscillator means coupled to said source of data signals, said oscillator turning on and producing an alternating current output signal in response to signals from said source at one of said two direct current voltage levels and turning off in response to signals from said source at the other of said two direct current voltage levels;

and rectifying means coupled between said oscillator means and said transmission means for full wave rectification of said alternating current output signal.

3. A data transmission system according to claim 1 wherein said receiver means further includes a full wave rectifier coupled to said oscillator means for full wave rectification of the alternating current output signal therefrom.

4. A data transmission system according to claim 3 wherein said receiver means includes a level setting circuit connected to said full wave rectifier for producing an output signal at a given level in response to rectified signals therefrom.

5. A data transmission system for binary data signals comprising a transmitter, a receiver, and transmission mean electrically connecting said transmitter and receiver;

said transmitter including a source of data signal which varies between two direct current voltage levels in accordance with binary data;

an oscillator means coupled to said source of data signals, said oscillator turning on and producing an alternating current output signal in response to signals from said source at one of said two direct current voltage levels and turning off in response to signals from said source at the other of said two direct current levels;

rectifying means coupled between said oscillator means and said transmission means for full wave rectification of said alternating current output signal;

said transmission means including first and second transmission wires forming a twisted pair transmission line for conducting said rectified transmitter output signal;

said receiver means including an oscillator means coupled between said first and second transmission wires and responsive to signal voltage differences between said transmission wires for producing an alternating current output signal;

a full wave rectifier coupled to said oscillator means for full wave rectification of the alternating current output signal therefrom;

and a level setting circuit connected to said full wave rectifier for producing an output signal at a given level in response to rectified signals therefrom.

No references cited.

JOHN W. CALDWELL, *Primary Examiner.*

J. T. STRATMAN, *Assistant Examiner.*